United States Patent [19]

Sakuma et al.

[11] Patent Number: 4,909,562
[45] Date of Patent: Mar. 20, 1990

[54] VANITY MIRROR ON A VISOR HAVING A SPRING-ENERGIZED, CONTROLLED-MOVEMENT MIRROR COVER

[75] Inventors: Toranosuke Sakuma, Shimizu; Hiromichi Nakayama, Yokohama, both of Japan

[73] Assignees: Koito Seisakusho Co., Ltd., Tokyo; Nifco Inc., Kanagawa, both of Japan

[21] Appl. No.: 263,607

[22] Filed: Oct. 27, 1988

[30] Foreign Application Priority Data

Oct. 28, 1987 [JP] Japan .................................. 62-165118
Mar. 3, 1988 [JP] Japan .................................. 63-28526

[51] Int. Cl.⁴ .............................................. B60J 3/00
[52] U.S. Cl. ..................................... 296/97.5; 16/381; 16/386
[58] Field of Search ................ 296/97.5, 97.2, 97.1; 220/326; 16/380, 381, 386

[56] References Cited

U.S. PATENT DOCUMENTS

| | | | |
|---|---|---|---|
| 2,078,096 | 4/1937 | Parkin | 220/326 X |
| 2,090,886 | 8/1937 | Dion | 220/326 X |
| 3,926,470 | 12/1975 | Marcus | 296/97.5 |
| 4,213,169 | 7/1980 | Kempkers | 362/74 |
| 4,491,899 | 1/1985 | Fleming | 296/97.5 X |
| 4,586,788 | 5/1986 | Hansen | 296/97.5 X |
| 4,614,004 | 9/1986 | Oshida | 16/82 |
| 4,660,881 | 4/1987 | Komeya et al. | 296/37.9 |
| 4,691,811 | 9/1987 | Arakawa et al. | 188/290 |
| 4,721,310 | 1/1988 | Gavagan et al. | 296/97.5 |
| 4,764,852 | 8/1988 | Sakuma | 362/135 |

FOREIGN PATENT DOCUMENTS

562662 7/1944 United Kingdom ................ 220/326

*Primary Examiner*—Robert R. Song
*Assistant Examiner*—Andrew C. Pike
*Attorney, Agent, or Firm*—Koda & Androlia

[57] ABSTRACT

A visor/mirror assembly comprising a visor subassembly having a visor, and a vanity mirror subassembly mounted to the visor. The vanity mirror subassembly comprises a mirror supported by a mirror frame on the visor, and a mirror cover hingedly mounted to the mirror frame for swinging between a closed position and an open position with respect to the mirror. A locking mechanism normally holds the mirror cover in the closed position against the force of a spring energizing the mirror cover toward the open position. Connected between the mirror frame and the mirror cover is a fluid damper which acts in opposition to the force of the spring for retarding the pivotal displacement of the mirror cover from the closed to the open position when the mirror cover is unlocked by finger pressure on the locking mechanism. With its momentum so reduced, the mirror cover comes to rest in the open position without shock or noise.

3 Claims, 11 Drawing Sheets

VANITY MIRROR ON A VISOR HAVING A SPRING-ENERGIZED, CONTROLLED-MOVEMENT MIRROR COVER

BACKGROUND OF THE INVENTION

This invention relates generally to visors for use on motor vehicles or the like, and more specifically to visors of the type having a vanity mirror attached thereto. Still more specifically, the invention pertains to such a visor/mirror assembly having a hinged mirror cover, with particular emphasis on provisions for controlling the pivotal displacement of the mirror cover between its closed and open positions.

Vehicle visors with built in vanity mirrors have been suggested and used extensively. It has also been proposed to provide a hinged cover for the vanity mirror because, left uncovered, the mirror would provide undesired reflections which might dazzle the driver. The mirror cover has customarily been opened either manually or by spring action. The manual type of mirror cover can be frictionally retained in any angular position intermediate the fully closed and fully open positions. This seeming advantage can turn into a total disadvantage, however, as the force of friction unavoidably lessens with the repeated opening and closing of the cover, until finally it becomes incapable of retaining the cover in a desired angular position.

One known type of visor/mirror assembly with a spring action mirror cover incorporates a two way biasing mechanism whereby the cover, on being manually moved to and released in a position slightly short of a half open position in either direction, automatically turns to the fully closed or fully open position. The two way biasing mechanism is objectionable because of the need for manually turning the mirror cover to an intermediate position in either covering or uncovering the cover. What is worse, on being released in the intermediate position, the mirror cover comes to an abrupt stop in the fully closed or fully open position with such momentum that the visor has been easy to undergo displacement from its preset angular position. The noise generated each time the cover snaps open or shut has also been a source of discomfort to the user.

In another known type of visor/mirror assembly the mirror cover is sprung only in the opening direction. A locking mechanism is provided for locking the cover in the closed position against the force of the spring. When unlocked, the cover is sprung open. This type of visor/mirror assembly is preferred because the vanity mirror can be uncovered with a minimum of handling, as by mere depression of a push button on the visor/mirror assembly. Here again, however, the mirror cover produces a considerable shock and noise when sprung open, because its acceleration is at a maximum in the fully open position.

SUMMARY OF THE INVENTION

The present invention solves the problem of how to open a mirror cover of a visor/mirror assembly without shock or noise and with a minimum of handling.

Briefly, the invention may be summarized as a visor/mirror assembly for use on a motor vehicle or the like comprising a visor subassembly having a visor, and a vanity mirror subassembly mounted to the visor. The vanity mirror subassembly comprises a mirror supported by a mirror frame which in turn is mounted fast to the visor of the visor subassembly. Hingedly mounted to the mirror frame, a mirror cover is biased from a closed position toward an open position by resilient means. A locking mechanism is provided for holding the mirror cover in the closed position against the bias of the resilient means, the locking mechanism being capable of manual actuation for unlatching the mirror cover and permitting the same to pivot from the closed to the open position under the bias of the resilient means. Also included is a damper acting between the mirror frame and the mirror cover for retarding the pivotal displacement of the mirror cover from the closed position to the open position and hence for causing the mirror cover to come to shockless rest in the open position despite the force of the resilient means.

Thus, upon actuation of the latch, the mirror cover will automatically open under the force of the resilient means. The damper, such for example as a fluid damper of conventional make, will control the movement of the cover, causing the same to open at such low speed that the cover will produce little or no shock or noise when it stops in the open position.

The above and other features and advantages of the invention and the manner of realizing them will become more apparent, and the invention itself will best be understood, from a study of the following description and appended claims, with reference had to the attached drawings showing some preferable embodiments of the invention.

DESCRIPTION OF THE PREFERRED EMBODIMENTS

General

Figure 1:
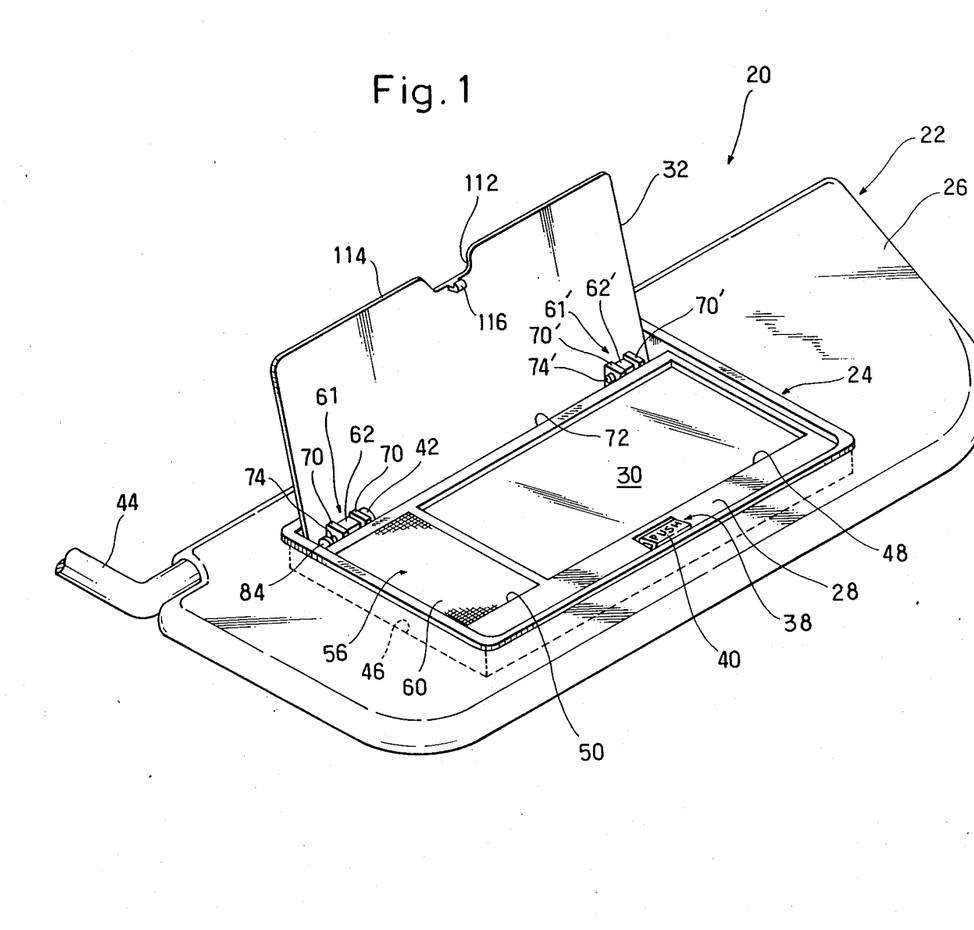
FIG. 1 is a perspective view of the visor/mirror assembly for vehicular use embodying the principles of the invention.

The exemplary form of the visor/mirror assembly in accordance with the invention is shown in its entirety in FIG. 1 and therein generally designated 20. The visor/mirror assembly 20 is herein shown adapted for installation interiorly of a vehicle windshield, not shown, for shielding the front seat occupant's eyes from the sunlight. Broadly, the visor/mirror assembly 20 comprises a visor subassembly 22 and a vanity mirror subassembly 24. The visor subassembly 22 can be of any known or suitable construction including a visor 26 to which the vanity mirror subassembly 24 may be mounted largely in a conventional manner.

Figure 2:
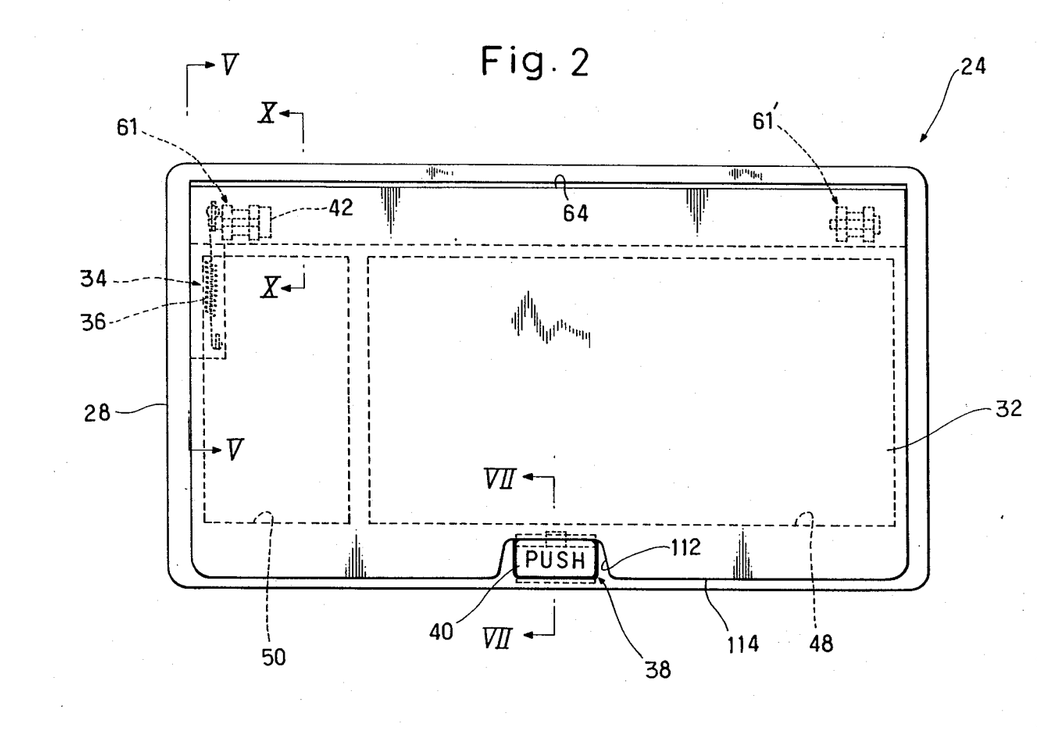
FIG. 2 is an enlarged front elevation of the vanity mirror subassembly incorporated in the visor/mirror assembly of FIG. 1, the vanity mirror subassembly being shown with the mirror cover in the closed position.
Figure 3:
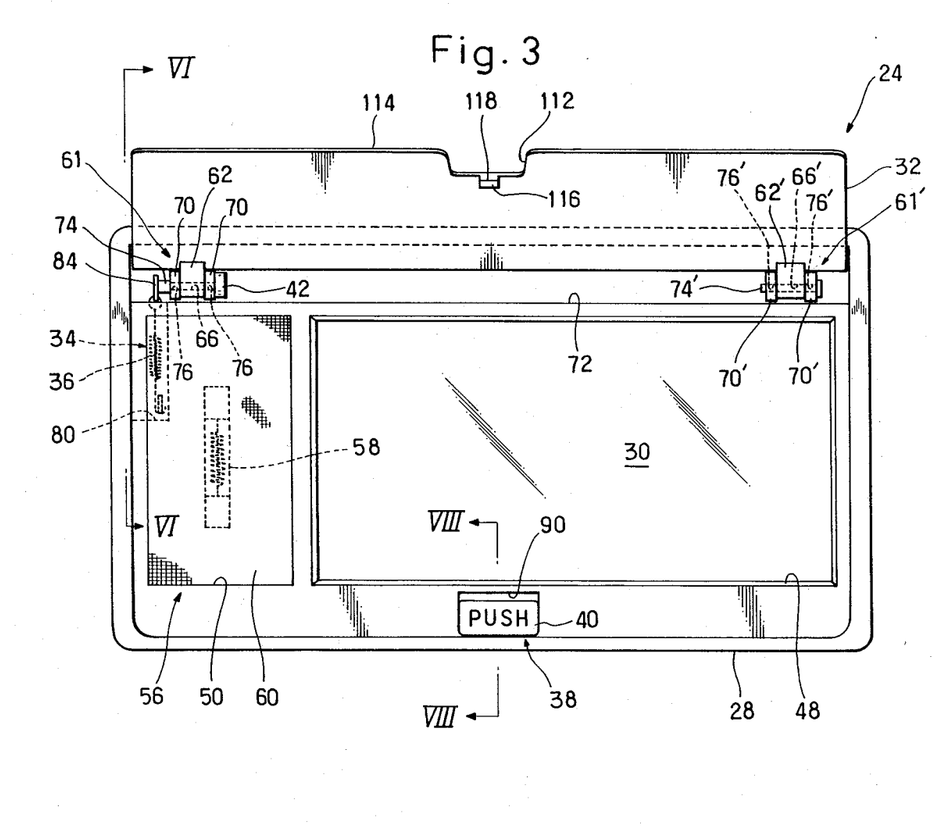
FIG. 3 is a view similar to FIG. 2 except that the mirror cover is shown in the open position.

FIGS. 2 and 3 show the vanity mirror subassembly 24 detached from the visor 26. As will be noted from FIGS. 1–3, the vanity mirror subassembly 24 comprises a mirror frame 28 supporting a mirror 30. A mirror cover 32 is hingedly coupled to the mirror frame 28 for pivotal displacement between a closed position of FIG. 2, where the cover 32 covers the mirror 30, and an open position of FIG. 3 where the cover uncovers the mirror. A cover biasing mechanism 34 comprises a helical tension spring 36 for biasing the mirror cover 32 from the FIG. 2 closed position toward the FIG. 3 open position. So spring loaded, the mirror cover 32 is latched in the closed position by a locking mechanism 38. A pushbutton latch 40, forming a part of the locking mechanism 38, may be manually actuated for unlatching the mirror cover 32 and thereby permitting the same to be sprung to the open position. A damper 42 acts between the mirror frame 28 and the mirror cover 32 for retarding the pivotal displacement of the mirror cover 32 from the closed to the open position under the force of the tension spring 36 and so mitigating the momentum of the mirror cover in order to bring it to shockless rest in the open position.

The following is a more detailed discussion of the visor subassembly 22 and of the above listed components of the vanity mirror subassembly 24, under separate headings. The vanity mirror subassembly components will be detailed in the order of the mirror frame 28 with the mirror 30, the mirror cover 32, the cover biasing mechanism 34, the cover locking mechanism 38 with the pushbutton latch 40, and the damper 42.

Visor Subassembly

With reference to FIG. 1 the visor subassembly 22 comprises the visor 26 of generally flat, approximately rectangular shape which is swingably mounted to a support rod 44. This rod 44 is attached to the vehicle just above the unshown windshield. The visor 26 is therefore swingable between an approximately vertical working position, for shielding the front seat occupant's eyes from the sunlight, and an approximately horizontal stored position.

The visor 26 itself can also be of prior art make comprising, for example, a relatively rigid core covered with a padding of suitable cushioning material and then with a covering of any such suitable material as cloth, leather, vinyl or the like. A recess 46 is cut in that side of the visor 26 which will face the front seat occupant when the visor is in the working position. The vanity mirror assembly 24 is mostly received in the recess 46.

Vanity Mirror Frame

Figure 7:
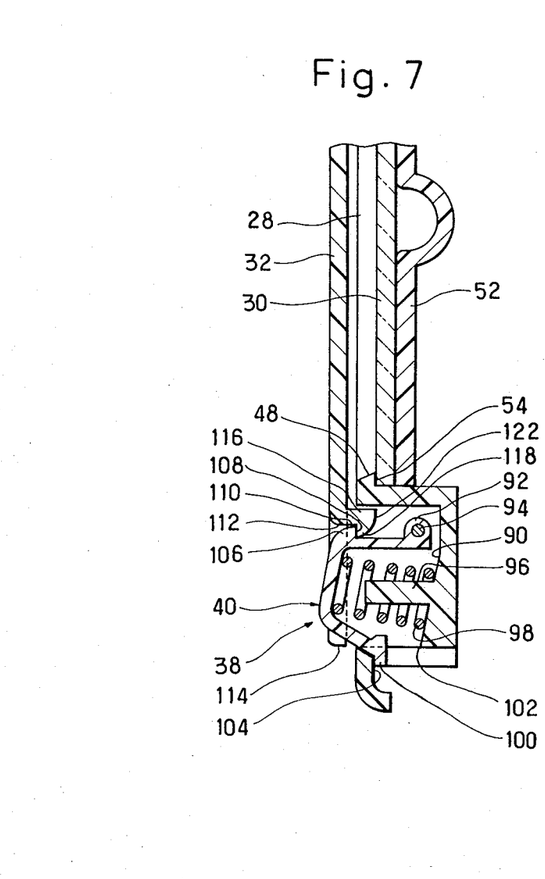
FIG. 7 is an enlarged, fragmentary section through the vanity mirror subassembly, taken along the line VII—VII in FIG. 2 and showing in particular the mirror cover locking mechanism, with the mirror cover latched in the closed position.
Figure 8:
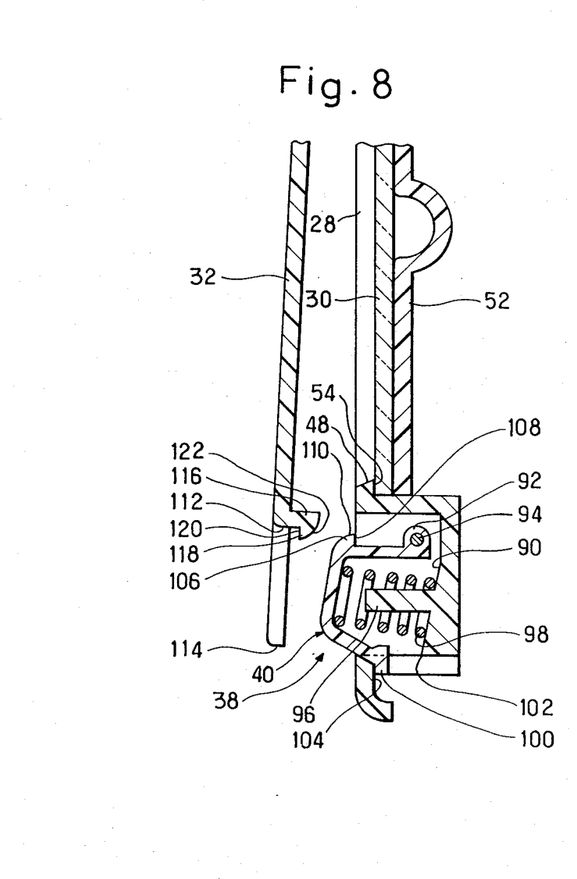
FIG. 8 is an enlarged fragmentary section through the vanity mirror subassembly, taken along the line VIII—VIII in FIG. 3 and showing the mirror cover locking mechanism with the mirror cover unlatched.
Figure 9:
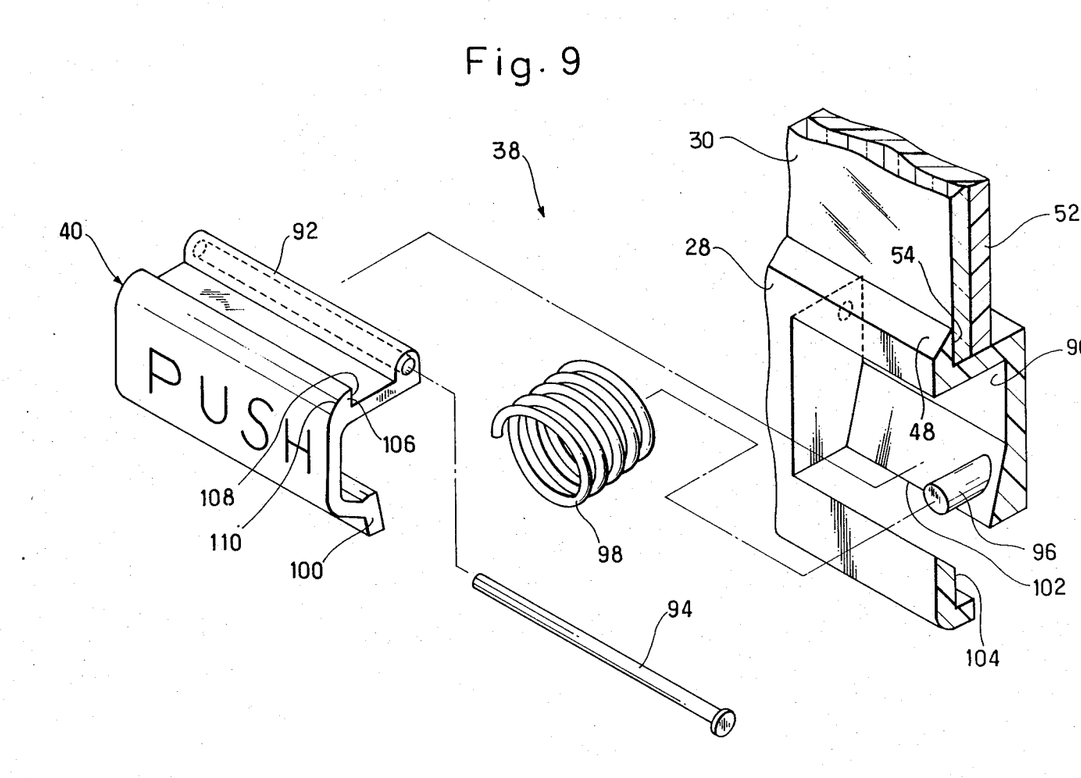
FIG. 9 is an enlarged, fragmentary exploded perspective view of the mirror cover locking mechanism.

FIGS. 1–3 indicate that the mirror frame 28 of the vanity mirror subassembly 24 is of generally flat, box-like shape and is closely engaged in the recess 46 in the visor 26. Molded of a plastic, the mirror frame 28 is formed to provide an opening 48 of rectangular shape and, to its left as viewed in FIGS. 2 and 3, another opening 50 which is also rectangular in shape but smaller in size than the opening 48. The mirror 30 together with a molded plastic mirror backing 52, FIGS. 7–9, is closely engaged in the first recited opening 48 and retained in position by rims such as shown at 54 in the same figures.

Mounted in the second opening 50 in the mirror frame 28 is a lighting system 56 comprising a lamp 58, FIG. 3, and a lens 60. Of course, as is well known in the art, a pair of such lamps and a pair of such lens could be provided on both sides of the mirror 30.

Mirror Cover

Figure 4:
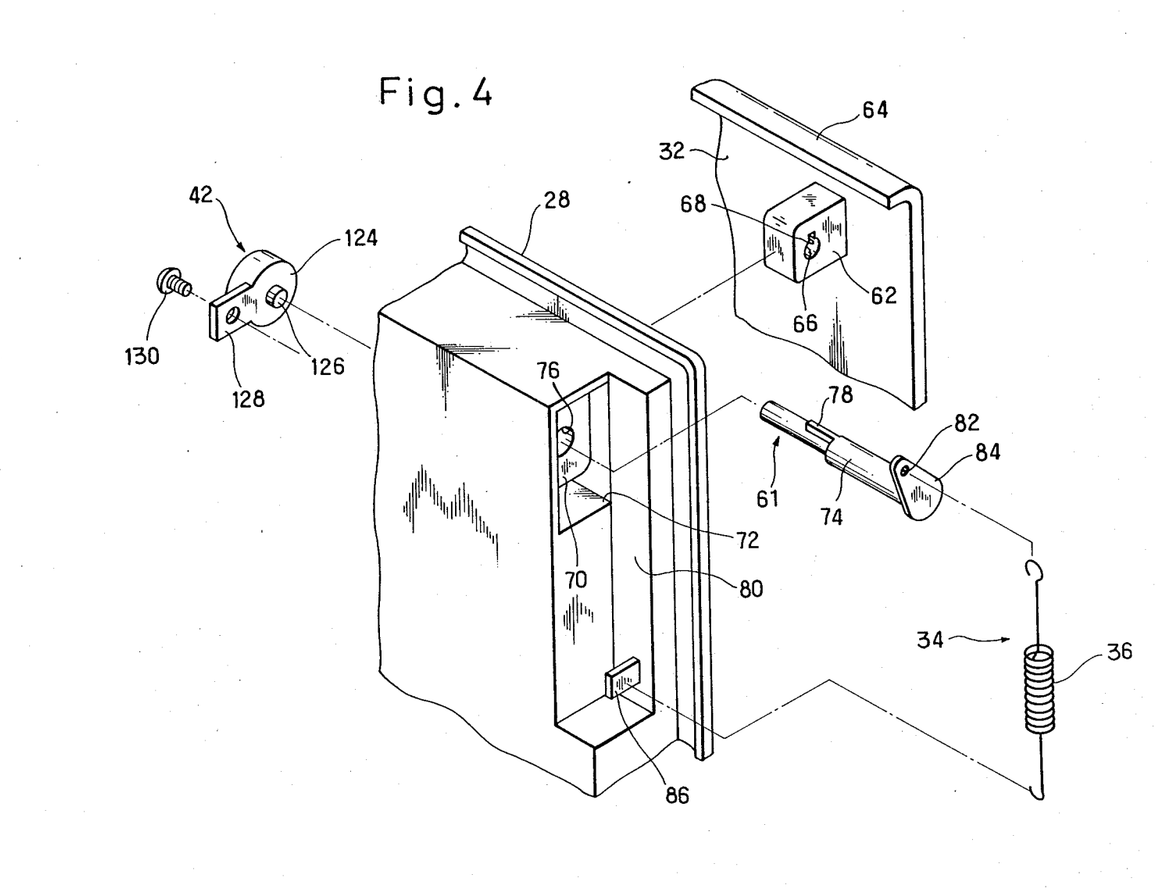
FIG. 4 is a still more enlarged, fragmentary exploded perspective view of the vanity mirror subassembly, showing in particular how the mirror cover is swingably coupled to the mirror frame, how the mirror cover is biased in the opening direction, and how the mirror cover movement is controlled in accordance with the invention.

While the mirror cover 32 appears in all of FIGS. 1–8, it will be best seen from FIGS. 1–3 that the mirror cover is in the form of a rectangular piece of generally flat, molded plastic sheet, sized to cover the complete face of the mirror frame 28. The mirror cover 32 is pivotally coupled to the mirror frame 28 via a pair of knuckle joint hinges 61 and 61'. Included in the knuckle joint hinges 61 and 61' are a pair of spaced eye knuckles 62 and 62' formed in one piece with the mirror cover 32. The eye knuckles 62 and 62' are disposed adjacent that edge 64, FIGS. 2 and 4, of the mirror cover 32 which is directed upwardly when the visor/mirror assembly 20 is in the vertical working position. Preferably, as best shown in FIG. 4, the edge 64 of the mirror cover 32 may be curved toward the mirror frame 28. The eye knuckles 62 and 62' have holes 66 and 66' formed therethrough. Further the left hand eye knuckle 62, as viewed in FIG. 3, has a keyway 68, FIG. 4, open to the hole 66.

The knuckle joint hinges 61 and 61' further comprise two pairs of jaw knuckles 70 and 70' which can be molded in one piece with the mirror frame 28 and which provide jaws for receiving the eye knuckles 62 and 62'. The jaw knuckle pairs 70 and 70' are disposed in an elongate recess or groove 72 extending along that edge of the mirror frame 28 which corresponds to the edge 64 of the mirror cover 32. The recess 72 has a length somewhat more than the side to side dimension of the mirror cover 32, and a width approximately one and a half times as much as the corresponding dimension of each eye knuckle 62 and 62' on the mirror cover 32.

Additionally, the knuckle joint hinges 61 and 61' comprise a pair of knuckle pins 74 and 74'. The knuckle pin 74, which is best illustrated in FIG. 4, extends through the hole 66 in the eye knuckle 62 and through holes 76 in one pair of jaw knuckles 70. A key 78 on the knuckle pin 74 is engaged in the keyway 68 in the eye knuckle 62, so that said knuckle pin 74 is constrained to rotate together with the mirror cover 32 for the purposes that will become apparent as the description proceeds. The other knuckle pin 74' extends through the hole 66' in the eye knuckle 62' and through holes 76' in the jaw knuckle pair 70'. The pair of knuckle pins 74 and 74' are in coaxial relation to each other.

So coupled to the mirror frame 28 via the pair of knuckle joint hinges 61 and 61', the mirror cover 32 is swingable between the closed position of FIG. 2 and the open position of FIGS. 1 and 3.

Cover Biasing Mechanism

Figure 5:
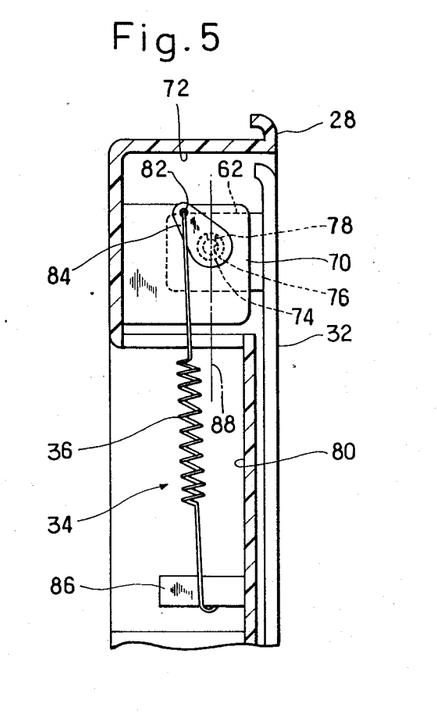
FIG. 5 is an enlarged, fragmentary section through the vanity mirror subassembly, taken along the line V—V in FIG. 2 and showing in particular the mirror cover biasing mechanism, with the mirror cover in the closed position.
Figure 6:
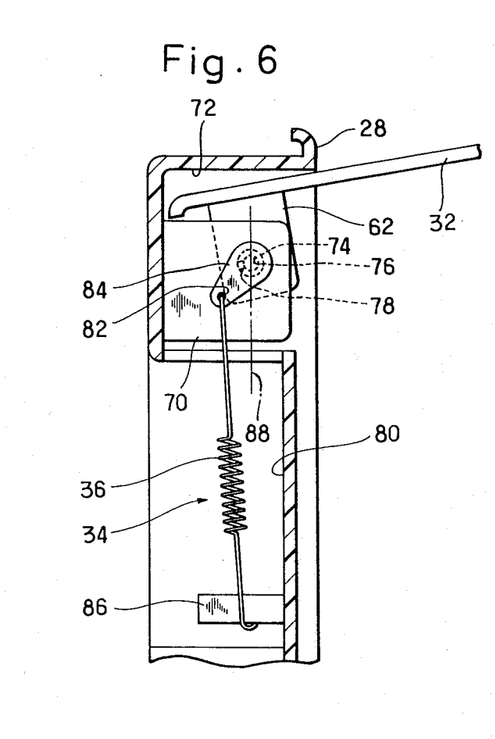
FIG. 6 is an enlarged fragmentary section through the vanity mirror subassembly, taken along the line VI—VI in FIG. 3 and showing the mirror cover biasing mechanism with the mirror cover in the open position.

Reference is directed principally to FIGS. 4-6 for an inspection of the mirror cover biasing mechanism 34. This mechanism includes said helical tension spring 36 which is accommodated in a recess 80 which is formed in the mirror frame 28 along one side thereof and which is open to one extremity of the recess 72. The tension spring 36 has one of two terminal hooks thereof engaged in a hole 82 formed in the distal end of a crank arm 84 which is mounted fast on the knuckle pin 74 of the knuckle point hinge 61. The other one of the two terminal hooks of the tension spring 36 is engaged with a spring retainer 86 formed in one piece with the mirror frame 28. It will be recalled that the knuckle pin 74 is constrained to rotate together with the mirror cover 32 via the key 78 engaged in the keyway 68 in the eye knuckle 62. Therefore, as the mirror cover 32 swings with respect to the mirror frame 28, so does the crank arm 84.

Let us assume that the visor/mirror assembly 20 is now disposed vertically, and that the mirror cover 32 is in the closed position as in FIGS. 2 and 5. Then, as indicated in FIG. 5, the crank arm 84 is in such an angular position that a distal end thereof is positioned away from the mirror cover 32 with respect to a vertical plane 88 containing the axes of the pair of knuckle pins 74 and 74'. Further the distal end of the crank arm 84 is positioned above a horizontal plane containing the axis of the knuckle pins 74 and 74'. Accordingly, the tension spring 36 energizes the mirror cover 32 from its FIG. 5 closed position toward its FIG. 6 open position, the tension spring being hooked in the distal end of the crank arm 84.

However, despite the energy of the tension spring 36, the mirror cover 32 can be held in the closed position by the locking mechanism 38, as will be set forth in detail hereafter.

Cover Locking Mechanism

The construction and operation of the cover locking mechanism 38 will be best understood from a study of FIGS. 7-9, although it appears also in FIGS. 1-3. The locking mechanism 38 includes said pushbutton latch 40 pivotally mounted in a recess 90. This recess 90 is defined in the mirror frame 28 adjacent its edge to be directed downwardly when the visor/mirror assembly 20 is in the vertical working position. The latch 40 is molded from a plastic into the shape of a recumbent U in cross section, including a sleeve 92 rotatably fitted over a shaft or pivot pin 94 having its opposite ends rigidly anchored to the mirror frame 28. Thus the latch 40 is pivotable relative to the mirror frame 28 about the axis of the pin 94 which is parallel to the axis of the pair of knuckle pins 74 and 74' joining the mirror cover 32 to the mirror frame 28.

Accommodated in the recess 90 and sleeved upon a support pin 96 formed in one piece with the mirror frame 28, a helical compression spring 98 acts between the mirror frame and the latch 40 for biasing the latter in a clockwise direction, as viewed in FIGS. 7 and 8, about the pivot pin 94. The latch 40 is formed to include a positioning rim 100 extending along its edge away from the sleeve 92. The rim 100 is received in an opening 102 of rectangular shape formed in the mirror frame 28.

Normally, or in the absence of finger pressure on the latch 40, the rim 100 is held against an abutment 104, which forms part of the mirror frame 28, under the bias of the compression spring 98. When the rim 100 is sprung into contact with the abutment 104, the latch 40 is in a latching position where the latch is capable of latching the mirror cover 32 in the closed position as shown in FIG. 7. How the latch 40 locks the mirror cover 32 will be detailed subsequently.

Perhaps as best seen in FIG. 9, the latch 40 has a ridge 106 formed thereon adjacent the sleeve 92 and in parallel spaced relation thereto. The ridge 106 has a flat, nonsloping side 108 facing the sleeve 92, and a rounded or sloping side 110. The mirror cover 32 is formed to include the following means for latching engagement with the ridge 106 of the latch 40.

FIGS. 1-3, 7 and 8 show a recess 112 formed centrally in the free edge 114 of the mirror cover 32. The recess 112 is so positioned on the mirror cover 32 so as to expose the latch 40 when the mirror cover is closed as in FIGS. 2 and 7. The mirror cover edge bounding the recess 112 has a small tongue 116 extending therefrom and bent toward the mirror frame 28. The tongue 116 terminates in a ridge 118 having a flat, nonsloping side 120 and a rounded or sloping side 122. The pushbutton latch 40 with the ridge 106 thereon engages and disengages the ridge 118 of the mirror cover 32 in the following manner.

An inspection of FIGS. 7 and 8 will show that the latch 40 occupies the same angular position relative to the mirror frame 28, with its positioning rim 100 sprung into contact with the abutment 104, regardless of whether the mirror cover 32 is latched in the closed position or not.

Let it be supposed that the mirror cover 32 is now being manually turned from the open to the closed position against the force of the tension spring 36 seen in FIGS. 5 and 6. As will be best understood from FIG. 8, the rounded side 122 of the mirror cover ridge 118 will first ride onto the rounded side 110 of the latch ridge 106. With the continued travel of the mirror cover 32 toward the fully closed position, the rounded side 122 of the mirror cover ridge 118 will slide over the rounded side 110 of the latch ridge 106 thereby causing the latch 40 to swing in a counterclockwise direction against the force of the compression spring 98. Finally, the mirror cover ridge 118 will ride off the latch ridge 106 thereby permitting the latch 40 to swing back clockwise under the force of the compression spring 98.

Then, as depicted in FIG. 7, the nonsloping side 108 of the latch ridge 106 will positively engage the nonsloping side 120 of the mirror cover ridge 118. Now the mirror cover 32 has been locked in the fully closed position.

For uncovering the mirror 30 the user may place a fingertip against the pushbutton latch 40 and press the same against the force of the compression spring 98. The latch 40 will then swing to an unlatching position where the latch ridge 106 disengages the mirror cover ridge 118. So unlatched, the mirror cover 32 will pivot from the closed to the open position under the bias of the tension spring 36.

Damper

Figure 10:
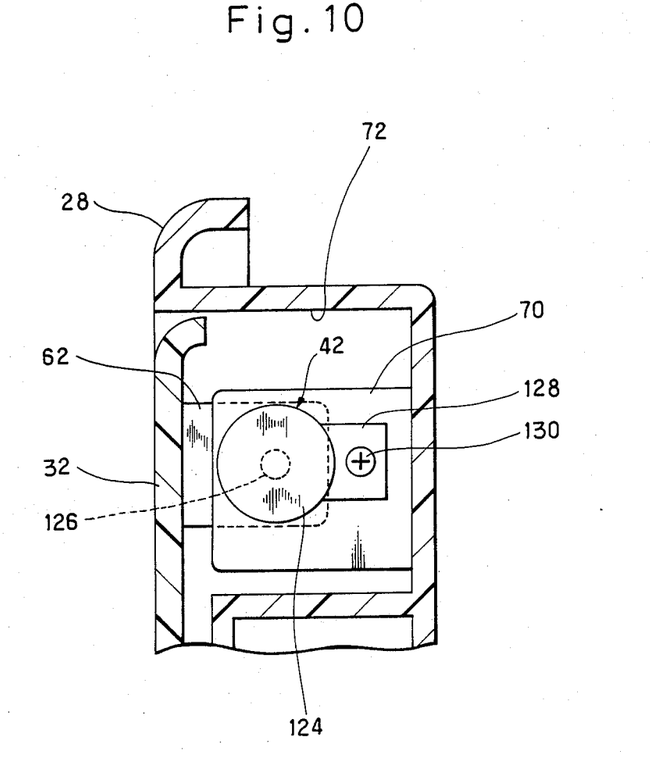
FIG. 10 is an enlarged, fragmentary section taken along the line X—X in FIG. 2 and showing in particular the damper for controlling the movement of the mirror cover with respect to the mirror frame.

FIGS. 4 and 10 best illustrate the damper 42 which takes the form of a fluid damper in this embodiment. The fluid damper 42 can be of conventional make comprising a fluid housing 124 filled with a viscous fluid such for example as a thick oil or grease, and a rotor, not shown, rotatable within the fluid housing in opposition to the resistance of the viscous fluid. The unshown rotor has a rotor shaft 126 rotatably extending outwardly from within the fluid housing 124. Further the fluid housing 124 has a rigid mounting lug 128 protruding therefrom. The mounting lug 128 is screwed or otherwise fastened by screw 130 to one of the pair of jaw knuckles 70 of the knuckle joint hinge 61. The rotor shaft 126, arranged coaxial with the knuckle pin 74, is rigidly coupled thereto in end to end relation.

As has been mentioned, the jaw knuckles 70 are integral parts of the mirror frame 28, whereas the knuckle pin 74 is keyed at 78 to the eye knuckle 62 which is integral part of the mirror cover 32. It will therefore be understood that the fluid housing 124 of the damper 42 is secured to the mirror frame 28, and the rotor shaft 126 rotated bidirectionally with the swinging of the mirror cover 32.

Thus, when unlatched from the closed position by the exertion of finger pressure on the pushbutton latch 40, the mirror cover 32 will swing toward the open position under the bias of the tension spring 36 and, at the same time, in opposition to the resistance offered by the viscous fluid of the fluid damper 42. The mirror cover 32 will move at reduced speed and, with its momentum so decreased, will come to rest in the open position without generating any noticeable shock or noise.

ALTERNATIVE EMBODIMENT

Figure 11:
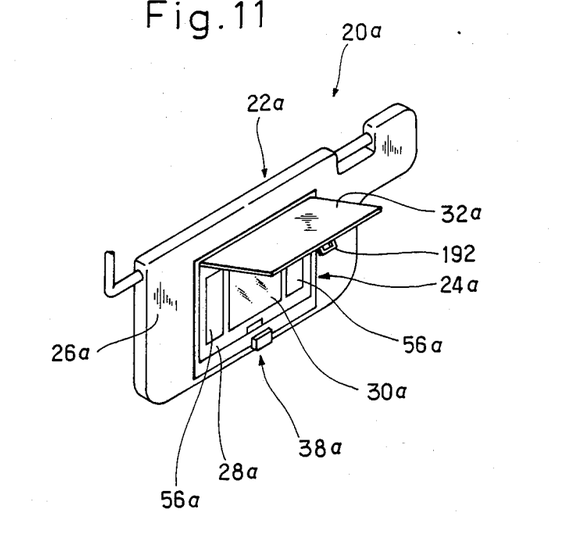
FIG. 11 is a perspective view of another preferred form of visor/mirror assembly in accordance with the invention.

FIG. 11 shows another preferred form of visor/mirror assembly 20a in accordance with the invention. The visor/mirror assembly 20a also comprises a visor subassembly 22a and a vanity mirror subassembly 24a. The visor subassembly 22a including a visor 26a can be of substantially the same construction as the visor subassembly 22 of the FIGS. 1-10 visor/mirror assembly 20.

Attached to the visor 26a, the vanity mirror subassembly 24a comprises a mirror frame 28a supporting a mirror 30a and a lighting system 56a, a mirror cover 32a swingably coupled to the mirror frame for covering and uncovering the mirror 30a as well as the lighting system 56a, and a locking mechanism 38a for locking the mirror cover 32a in the closed position.

Figure 12:
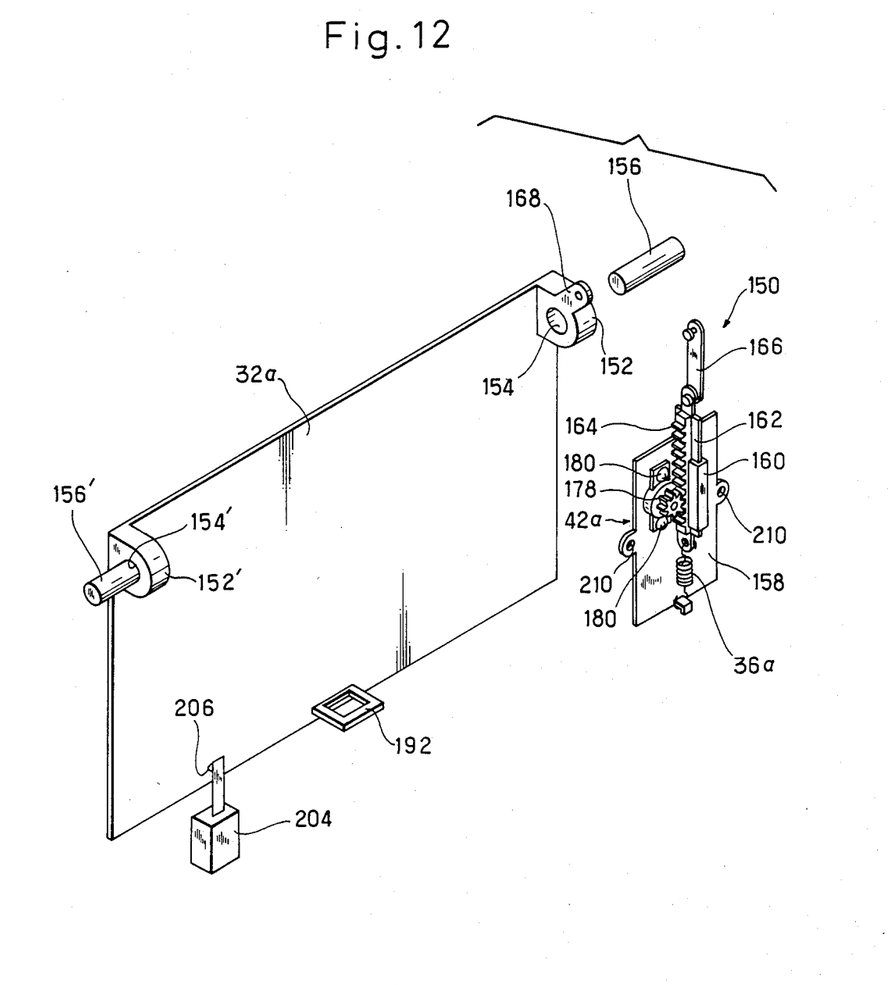
FIG. 12 is an enlarged, exploded perspective view of some important components of the vanity mirror subassembly included in the visor/mirror assembly of FIG. 11.

FIG. 12 is an illustration of the mirror cover 32a as seen from the mirror side, together with a mirror cover control mechanism 150 forming the gist of this alternative visor/mirror assembly 20a. The mirror cover 32a is molded in one piece with a pair of lugs 152 and 152' having holes 154 and 154' extending therethrough in alignment with each other. Suitably coupled to the mirror frame 28a, a pair of trunnions 156 and 156' extend through the holes 154 and 154' in the lugs 152 and 152', so that the mirror cover 32a is swingable about the trunnions 156 and 156' with respect to the mirror frame 28a.

Figure 13:
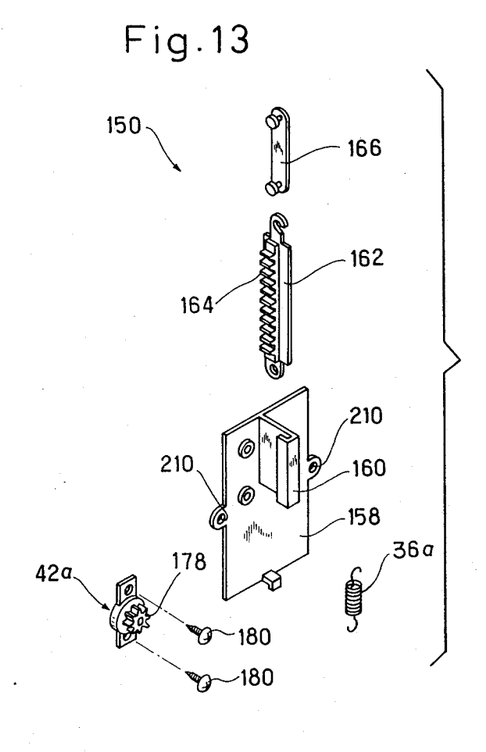
FIG. 13 is an exploded perspective view of the mirror cover control mechanism which is included in the FIG. 12 visor/mirror assembly and which is shown also in FIG. 12.

The construction of the mirror cover control mechanism 150 will be better understood by referring also to FIG. 13, which shows the cover control mechanism in exploded perspective. The mirror cover control mechanism 150 comprises both a helical tension spring 36a for biasing the mirror cover 32a from the closed toward the open position, and a damper 42a for retarding the swinging motion of the mirror cover.

Providing a support for both tension springs 36a and damper 42a is a baseplate 158 which is mounted within the mirror frame 28a in fixed relation thereto. The baseplate 158 is formed in one piece with a rack guide 160 extending linearly at right angles with the axis of the pair of trunnions 156 and 156' and parallel to the plane of the mirror 30a. Slidably engaged with the rack guide 160 is a slider 162 formed integral with, and extending along, a rack 164. One end of the rack 164 is pivotally coupled to one of two ends of a link 166. This link 166 has the other of the two ends thereof pivotally coupled to a lever 168 extending radially from the lug 152 on the mirror cover 32a. It will therefore be seen that the mirror cover 32a swings between the closed and open positions as the rack 164 travels linearly as guided by the rack guide 160.

The tension spring 36a is connected between baseplate 158 and rack 164 for biasing the mirror cover 32a from the closed toward the open position. The rack 164 is further coupled to the damper 42a as set forth in the following.

Figure 14:
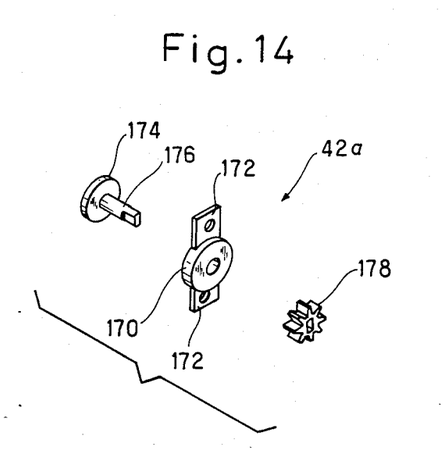
FIG. 14 is an enlarged, exploded perspective view of the damper included in the mirror cover control mechanism of FIG. 13.

As illustrated in detail in FIG. 14, the damper 42a includes a fluid housing 170, complete with a pair of mounting lugs 172, which contains a viscous fluid. Rotatably mounted within the fluid housing 170, a rotor 174 has a shaft 176 extending outwardly of the fluid housing 170 and normal to the plane of the mirror. A pinion 178 is fixedly mounted on the rotor shaft 174.

A reference back to FIG. 12 will indicate that the fluid housing 170 of the damper 42a is mounted fast to the baseplate 158 by having its mounting lugs 172 fastened thereto by a pair of screws 180. With the fluid damper 42a so mounted to the baseplate 158, the pinion 178 on the rotor shaft 176 thereof meshes with the rack 164. Thus, as the mirror cover 32a swings from the closed toward the open position under the force of the tension spring 36a acting on the rack 164, the damper 42a functions to retard the swinging movement of the mirror cover and hence to bring the same to rest in the open position without shock or noise.

Figure 15:
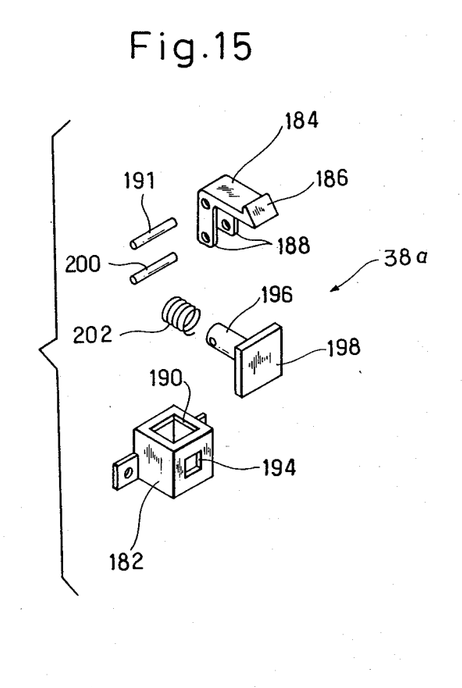
FIG. 15 is an enlarged, exploded perspective view of the mirror cover locking mechanism included in FIG. 12 visor/mirror assembly.

FIG. 15 shows in exploded perspective the mirror cover locking mechanism 38a of the visor/mirror assembly 20a. The locking mechanism 38a includes a boxlike support structure 182 which is screwed or otherwise secured to the mirror frame 28a. A latch 184 with a hook 186 has a pair of legs 188 which are received in the support structure 182 via an opening 190 formed therein. The latch legs 188 are pivoted on a pin 191 secured to the support structure 182. With the pivotal movement of the latch 184 with respect to the support structure 182, the hook 186 on the latch is movable into and out of latching engagement with a loop 192, FIGS. 11 and 12, on the free end of the mirror cover 32a when the latter is in the closed position with respect to the mirror frame 28a.

The support structure 182 has another opening 194 defined therein for receiving a shank 196 of a push button 198. The shank 196 pinned by pin 200 to the pair of legs 188 of the latch 184. Mounted within the support structure 182, a helical compression spring 202 urges the push button 198 away from the support structure, with the result that the latch 184 is biased into latching engagement with the mirror cover loop 192.

Seen at 204 in FIG. 12 is an electrical switch assembly having a sensing arm 206 held against the mirror cover 32a when the latter is in the closed position. When the mirror cover is opened, the switch assembly 204 is to be actuated to cause the lighting system 56a to glow.

When the mirror cover 32a is in the closed position with respect to the mirror frame 28a, the compression spring 202 of the cover locking mechanism 38a will urge the latch hook 186 into positive engagement with the mirror cover loop 192 thereby locking the mirror cover 32a in the closed position. Upon exertion of fingertip pressure on the push button 198, the latch 184 will pivot against the force of the compression spring 202 for unlatching the mirror cover 32a. Thereupon, as the tension spring 36a exerts a downward pull, as viewed in FIG. 12, on the rack 164, the mirror cover 32a will start swinging toward the open position. The lighting system 56a will glow as the switch 204 senses the movement of the mirror cover 32a toward the open position.

In spite of the pull of the tension spring 36a the mirror cover 32a will swing slowly to the open position as the fluid damper 42a retards the linear displacement of the rack 164 via the pinion 178. It should be noted that in this alternative embodiment, the mirror cover 32a or either of its trunnions 156 and 156' is not directly coupled to the damper 42a but via the rack 164 and pinion 178. Consequently, the axis of the damper 42a can be disposed at right angles with the plane of the mirror 30a, rather than parallel to the axis of the swinging motion of the mirror cover 32a. This arrangement of the damper 42a serves to make the thickness of the vanity mirror assembly 24a, and therefore of the complete visor/mirror assembly 20a, appreciably less than if the damper axis were parallel to, or collinear with, the mirror cover axis.

It should also be appreciated that the tension spring 36a, damper 42a, rack 160 and rack guide 164 are all mounted to the common baseplate 158. The mirror cover control mechanism 150 may therefore be preassembled and readily mounted in position on the mirror frame 28a, as by threaded fastener elements inserted in holes 210 in the baseplate 158.

Despite the foregoing disclosure of the specific visor/mirror assemblies embodying the invention, it is understood that they are not to impose limitations upon the invention. Various modifications may be made in the details of the illustrated embodiments to conform to the requirements of each specific application of the invention or to design preferences, without departing from the scope of the invention.

What is claimed is:

1. A visor/mirror assembly for use on a motor vehicle or the like, comprising a visor subassembly having a visor, and a vanity mirror subassembly mounted to the visor, the vanity mirror subassembly comprising:
   - a mirror frame mounted fast to the visor of the visor subassembly;
   - a mirror supported by the mirror frame;
   - a mirror cover hingedly mounted to the mirror frame for pivotal movement between a closed position, where the mirror cover covers the mirror, and an open position where the mirror cover uncovers the mirror;
   - resilient means biasing the mirror cover from the closed position toward the open position;
   - locking means for holding the mirror cover in the closed position against the bias of the resilient means, the locking means being capable of actuation for unlocking the mirror cover and permitting the same to pivot from the closed position to the open position under the bias of the resilient means;
   - a damper acting between the mirror frame and the mirror cover for retarding the pivotal displacement of the mirror cover from the closed position to the open position and hence for causing the mirror cover to come to shockless rest in the open position despite the force of the resilient means, said damper comprising a fluid damper which comprises a fluid housing mounted in fixed relation to the mirror frame and a rotor shaft rotatably mounted to the fluid housing;
   - guide means secured to the mirror frame;
   - a rack supported by the guide means for linear movement with respect to the mirror frame in a direction at right angles to a pivotal axis of the mirror cover with respect to the mirror frame;
   - a linkage operatively connecting the rack to the mirror cover so as to enable the latter to swing between the closed and open positions with the linear movement of the rack; and
   - a pinion fixedly mounted on the rotor shaft of the fluid damper and meshed with the rack; and
   - wherein the resilient means acts on the rack to urge the same in a direction such that the mirror cover tends to pivot from the closed toward the open position; and
   - the rotor shaft of the fluid damper extends normal to the plane of the mirror.

2. The visor/mirror assembly of claim 1 wherein the locking means comprises:
   (a) a pushbutton latch mounted to the mirror frame for pivotal displacement between a latching position, where the latch is capable of latching engagement with the mirror cover when the latter is manually pivoted from the open position to the closed position against the force of the resilient means, and an unlatching position where the latch unlatches the mirror cover; and
   (b) second resilient means for biasing the latch from the unlatching position toward the latching position;
   (c) the pushbutton latch being capable of manual actuation from the latching position to the unlatching 3. The visor/mirror assembly of claim 1 further comprising a baseplate having mounted thereto all of the guide means and the rack and the resilient means and the fluid damper, the baseplate being secured to the mirror frame.

* * * * *

UNITED STATES PATENT AND TRADEMARK OFFICE
CERTIFICATE OF CORRECTION

PATENT NO. : 4,909,562
DATED      : MARCH 20, 1990
INVENTOR(S) : TORANOSUKE SAKUMA and HIROMICHI NAKAYAMA It is certified that error appears in the above-identified patent and that said Letters Patent is hereby corrected as shown below:

Column 10, paragraph (c), line 3, after "ing", enter:
--position against the bias of the second resilient means for unlatching the mirror cover.--

Signed and Sealed this

Sixteenth Day of July, 1991

Attest:

HARRY F. MANBECK, JR.

*Attesting Officer*    *Commissioner of Patents and Trademarks*